(12) United States Patent
Alissa et al.

(10) Patent No.: US 11,988,060 B2
(45) Date of Patent: *May 21, 2024

(54) SYSTEMS AND METHODS IN WHICH POLYACRYLAMIDE GEL IS USED TO RESIST CORROSION OF A WELLHEAD COMPONENT IN A WELL CELLAR

(71) Applicant: Saudi Arabian Oil Company, Dhahran (SA)

(72) Inventors: Faisal Mohammed Alissa, Dammam (SA); Sameer Abdulaziz Aleissa, Al Hofuf (SA); Khalid I. Alhamed, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 17/710,021

(22) Filed: Mar. 31, 2022

(65) Prior Publication Data

US 2023/0313628 A1    Oct. 5, 2023

(51) Int. Cl.
*E21B 33/03* (2006.01)
*C08J 3/05* (2006.01)

(52) U.S. Cl.
CPC ............... *E21B 33/03* (2013.01); *C08J 3/05* (2013.01); *C08J 2333/26* (2013.01)

(58) Field of Classification Search
CPC ........ E21B 33/03; E21B 33/0375; C08J 3/05; C08J 2333/26
See application file for complete search history.

(56) References Cited

U.S. PATENT DOCUMENTS

| | | | |
|---|---|---|---|
| 3,461,957 A | 8/1969 | West | |
| 3,498,392 A | 3/1970 | Knorr | |
| 3,654,993 A | 4/1972 | Smith et al. | |
| 4,664,193 A | 5/1987 | Wu | |
| 4,745,139 A | 5/1988 | Hassl et al. | |
| 4,844,164 A | 7/1989 | Shen | |
| 5,623,993 A | 4/1997 | Van Buskirk et al. | |
| 6,121,336 A | 9/2000 | Okoroafor et al. | |
| 6,913,081 B2 * | 7/2005 | Powell | E21B 33/138 166/279 |
| 7,732,016 B2 | 6/2010 | Van Ooij et al. | |
| 7,987,904 B1 | 8/2011 | Rose | |
| 8,900,670 B2 | 12/2014 | Singh et al. | |

(Continued)

FOREIGN PATENT DOCUMENTS

| CA | 898687 | 4/1972 |
|---|---|---|
| CN | 109458128 | 3/2019 |

(Continued)

OTHER PUBLICATIONS

U.S. Appl. No. 17/709,819, filed Mar. 31, 2022, Alissa et al.

(Continued)

*Primary Examiner* — D. Andrews
*Assistant Examiner* — Ronald R Runyan
(74) *Attorney, Agent, or Firm* — Fish & Richardson P.C.

(57) ABSTRACT

Systems and methods use polyacrylamide gel to resist corrosion of one or more wellhead components in a well cellar. Examples of such wellhead components include a surface casing and a landing base. The well cellar is part of a well, such as an oil well, a gas well or a water well.

20 Claims, 7 Drawing Sheets

(56) References Cited

U.S. PATENT DOCUMENTS

| | | | |
|---|---|---|---|
| 9,199,879 | B2 | 12/2015 | Thaemlitz et al. |
| 10,995,906 | B1 | 5/2021 | Meheen et al. |
| 2004/0033905 | A1 | 2/2004 | Shinbach et al. |
| 2004/0154799 | A1 | 8/2004 | Powell et al. |
| 2006/0134339 | A1 | 6/2006 | Wang et al. |
| 2013/0081955 | A1 | 4/2013 | Al-Mubasher |
| 2014/0076563 | A1 | 3/2014 | Lin et al. |
| 2015/0101831 | A1 | 4/2015 | Dugas et al. |
| 2016/0090806 | A1* | 3/2016 | Dugas .................... E21B 33/02 166/75.13 |
| 2016/0222747 | A1 | 8/2016 | Rose |
| 2017/0349763 | A1 | 12/2017 | Wu et al. |
| 2018/0208826 | A1 | 7/2018 | Bourcier et al. |
| 2018/0327648 | A1 | 11/2018 | Bataweel et al. |
| 2022/0010192 | A1* | 1/2022 | Lewis .................... E21B 21/003 |

FOREIGN PATENT DOCUMENTS

| | | | |
|---|---|---|---|
| CN | 111022020 | 4/2020 | |
| EP | 3353368 | 2/2021 | |
| WO | 2004061046 | 7/2004 | |
| WO | WO-2004104557 A2 * | 12/2004 | ............... A61N 1/30 |
| WO | 2009059798 | 5/2009 | |
| WO | 2014190226 | 11/2014 | |
| WO | 2015103096 | 7/2015 | |
| WO | 2018091986 | 5/2018 | |

OTHER PUBLICATIONS

U.S. Appl. No. 17/710,011, filed Mar. 31, 2022, Alissa et al.

Ahmad et al., "Hydrophobicity—a green technique for enhancing corrosion resistance of alloys." New Trends in Alloy Development, Characterization and Application, Sep. 2015, 43 pages.

Drdlová et al., "Effect of nanoparticle modification on static and dynamic behaviour of foam based blast energy absorbers." Cellular Polymers 35.3, May 2016, 143-158, 16 pages.

Gurav et al., "Silica aerogel: synthesis and applications." Journal of Nanomaterials, Jan. 2010, 11 pages.

Hillesheim et al., "Effects of Surface Modification Conditions on Hydrophobicity of Silica-based Coating Additives." Corrosion 2013. OnePetro, Mar. 2013, 11 pages.

Hunt et al., "Kinetics of the gelation of colloidal silica at geothermal conditions, and implications for reservoir modification and management" No. LLNL-CONF-614952. Lawrence Livermore National Lab.(LLNL), Livermore, CA (United States), Jan. 2013, 12 pages.

Jiantao, L., & Bingzheng, H. (2013). Development of Silica Aerogel and Hollow Glass Microspheres Based Heat-Insulating Coatings [J]. Paint & Coatings Industry, 7., 2013, 2 pages (Abstract Only).

Keivani et al., "Synergistic toughening in ternary silica/hollow glass spheres/epoxy nanocomposites." Polymer-Plastics Technology and Engineering 54.6, Apr. 2015, 581-593, 14 pages.

Lesbayev et al., "Hydrophobic sand on the basis of superhydrophobic soot synthesized in the flame." Journal of Materials Science and Chemical Engineering 2.1, Jan. 2014, 63-65, 3 pages.

Magryta, "Wpływ aerożelu na właściwości wulkanizatów kauczuku butadienowo-akrylonitrylowego (NBR)." Polimery 57.2, Feb. 2012, 117-123, 7 pages.

Maleki et al., "An overview on silica aerogels synthesis and different mechanical reinforcing strategies." Journal of Non-Crystalline Solids 385, Feb. 2014, 55-74, 20 pages.

Rotaru et al., "Performances of clay aerogel polymer composites for oil spill sorption: Experimental design and modeling." Separation and Purification Technology 133, Sep. 2014, 260-275, 16 pages.

Shi et al., "Superhydrophobic silica aerogels reinforced with polyacrylonitrile fibers for adsorbing oil from water and oil mixtures." RSC advances 7.7, 2017, 4039-4045, 7 pages.

Vu et al., "Evaluation of the corrosion inhibiting capacity of silica/polypyrrole-oxalate nanocomposite in epoxy coatings." International Journal of Corrosion, Jan. 2018, 11 pages.

Zhao et al., "Chemical solution to ESP packer penetrator corrosion problem." International Petroleum Technology Conference. OnePetro, Jan. 2020, 7 pages.

Zhao et al., "Development of low density rigid gels/composites for ESP packer penetrator protection." SPE Kingdom of Saudi Arabia Annual Technical Symposium and Exhibition. OnePetro, Apr. 2018, 10 pages.

Zuo et al., "Polymer/carbon-based hybrid aerogels: preparation, properties and applications" Materials, 8(10), Oct. 2015, 6806-6848., 43 pages.

Jurlnak et al., "Oilfield Applications of colloidal silica gel," SPE Production Engineering, Nov. 1991, 7 pages.

PCT International Search Report in International Appln. No. PCT/US2023/017070, dated Jun. 30, 2023, 14 pages.

PCT International Search Report in International Appln. No. PCT/US2023/016748, dated Jun. 28, 2023, 12 pages.

croftsystems.net [online], "Christmas Tree or Wellhead?" available on or before 2009, retrieved on Jun. 15, 2023, retrieved from URL <https://www.croftsystems.net/oil- as-blog/the-difference-between-a-wellhead-christmas-tree-2/>, 7 pages.

* cited by examiner

SYSTEMS AND METHODS IN WHICH POLYACRYLAMIDE GEL IS USED TO RESIST CORROSION OF A WELLHEAD COMPONENT IN A WELL CELLAR

FIELD

The disclosure generally relates to systems and methods in which polyacrylamide gel is used to resist corrosion of a wellhead component in a well cellar. Typically, the polyacrylamide in the gel is uncrosslinked.

BACKGROUND

In general, an oil producing well has wellhead components that are above ground and wellhead components that are belowground. Some of the wellhead components that are belowground are present in the well cellar. Examples of such wellhead components include the surface casing and the landing base. In general, the wellhead components in the well cellar are covered with sand. In some cases, an above ground wellhead component, such as a water injection line flange, can leak and cause the sand in the well cellar to get wet. In certain cases, rain causes the sand in the well cellar to get wet. Other sources of water can also make the sand in the well cellar wet. The water in the sand in the well cellar can result in corrosion of one or more of the wellhead components present in the well cellar, such as the landing base and/or the surface casing. In addition to water itself, corrosion can be induced by oxygen dissolved in the water.

SUMMARY

The disclosure generally relates to systems and methods in which polyacrylamide gel is used to resist corrosion of a wellhead component in a well cellar. For example, the well of the system can be an oil well, a gas well or a water well. Typically, the polyacrylamide in the gel is uncrosslinked. In general, rather than simply covering a surface of the wellhead component with a relatively thin coating, the disclosure provides a polyacrylamide gel that occupies a volume that extends from the surface of the wellhead component to the bottom and sidewalls of the well cellar. As an example, in some embodiments, the polyacrylamide gel covers a portion of the surface of a wellhead surface casing and extends to the bottom and sidewalls of the well cellar such that the polyacrylamide gel occupies a volume of space between the well cellar and the covered surface of the surface casing. As another example, in certain embodiments, the polyacrylamide gel covers at least a portion of (e.g., completely covers) the surface of a landing base and extends to the base bottom and sidewalls of the well cellar such that the polyacrylamide gel occupies a volume of space between the well cellar and the covered surface of the landing base. As a further example, in some embodiments, the polyacrylamide gel covers a portion of the surface of a wellhead surface casing and at least a portion of (e.g., completely covers) the surface of the landing base and extends to the base bottom and sidewalls of the well cellar such that the polyacrylamide gel occupies a volume of space between the well cellar, and the covered surface of the wellhead surface casing and the covered surface of the landing base. In general, sand is disposed on top of the polyacrylamide gel and completely covers the upper surface of the gel. Typically, therefore, the polyacrylamide gel is not directly exposed at the earth's surface.

Over a substantial period of time, little if any of the water in the sand covering the polyacrylamide gel is able to penetrate through the polyacrylamide gel to reach the gel-covered wellhead component(s). Thus, the polyacrylamide gel helps resist, or even completely prevent, corrosion of the gel-covered well components. Without wishing to be bound by theory, it is believed that the polyacrylamide gel that is in contact with the sand can seal the pores within the sand to prevent water from dispersing into the sand network. For example, when water is disposed on top of such sand, the water does not enter the network. Instead, the water remains on top of the sand network, ultimately evaporating. In this manner, the gel can behave as a barrier to water and optionally other liquids.

The systems and related methods can be relatively inexpensive and easy to produce and implement. In addition, the systems and methods can mitigate safety issues and environmental impacts related to corrosion of wellhead components. Further, the systems and methods can reduce or eliminate the need for repairing and/or replacing corroded wellhead components, which can be costly and difficult. Additionally, systems and methods according to the disclosure can reduce the time and cost associated with monitoring and inspecting for corrosion of wellhead components. As an example, the landing base is a wellhead component located in the well cellar. In general, the landing base cannot be replaced riglessly. As a result, the lost use time of the well and/or the cost associated with repairing or replacing the landing base can be substantial. As another example, the portion of a wellhead surface casing in the well cellar can get severely corroded by moisture. Repairing such a corroded surface casing can involve a deep excavation of the wellhead, and replacing such a corroded surface casing can involve a workover. Therefore, using polyacrylamide gel to reduce or eliminate corrosion of the landing base and/or a wellhead surface casing can result in substantial savings and improved productivity.

In a first aspect, the disclosure provides a system that includes a well cellar, a wellhead and a polyacrylamide gel. The well cellar has a bottom and sidewalls extending from the bottom. The wellhead has an aboveground region extending above the well cellar and a belowground region in the well cellar. The belowground region of the wellhead includes a wellhead component having an exterior surface. The polyacrylamide gel occupies a volume extending from the bottom and sidewalls of the well cellar to the exterior surface of the wellhead component. The polyacrylamide gel covers the exterior surface of the wellhead component.

In some embodiments, the polyacrylamide in the gel is uncrosslinked.

In some embodiments, the polyacrylamide in the gel has a number average molecular weight of from 1,000 to 10,000,000 g/mol.

In some embodiments, the polyacrylamide in the gel has a weight average molecular weight of from 1,000 to 10,000,000 g/mol.

In some embodiments, the polyacrylamide gel substantially prevents water from passing through the polyacrylamide gel to reach the exterior surface of the wellhead component.

In some embodiments, the system further includes a solid covering an upper surface of the polyacrylamide gel.

In some embodiments, the system further includes sand covering an upper surface of the polyacrylamide gel. The polyacrylamide gel can seal pores in the sand.

In some embodiments, the wellhead component includes a landing base.

In some embodiments, the wellhead component includes a surface casing.

In some embodiments, the polymer gel covers an exterior surface of an additional wellhead component.

In some embodiments, the polymer gel covers an exterior surface of multiple different components of the wellhead, such a surface casing and a landing base.

In some embodiments, the system includes a well selected from the group consisting of an oil well, a gas well and a water well.

In some embodiments, the volume occupied by the gel is at least one cubic foot.

In some embodiments, the bottom of the well cellar has an opening, and the wellhead includes a plurality of casings that pass through and extend beneath the bottom of the well cellar.

In some embodiments, the plurality of casings include a surface casing that houses the other casings.

In a second aspect, the disclosure provides a well that is an oil well, a gas well or a water well. The well includes a well cellar, a wellhead and a polyacrylamide gel. The well cellar has a bottom and sidewalls extending from the bottom. The wellhead has an aboveground region extending above the well cellar and a belowground region in the well cellar. The belowground region of the wellhead includes a wellhead component having an exterior surface. The polyacrylamide gel occupies a volume extending from the bottom and sidewalls of the well cellar to the exterior surface of the wellhead component. The polyacrylamide gel covers the exterior surface of the wellhead component.

In a third aspect, the disclosure provides a method of reducing corrosion of an exterior surface of a wellhead component in a well cellar. The method includes disposing a polyacrylamide gel within the well cellar so that the polymer gel covers the exterior surface of the wellhead component and extends to a bottom and sidewalls of the well cellar.

In some embodiments, disposing the polyacrylamide gel within the well cellar includes disposing polyacrylamide within the well cellar, and adding water to the polyacrylamide to form the polyacrylamide gel.

In some embodiments, the method further includes covering the polyacrylamide gel with sand.

DETAILED DESCRIPTION

Figure 1:
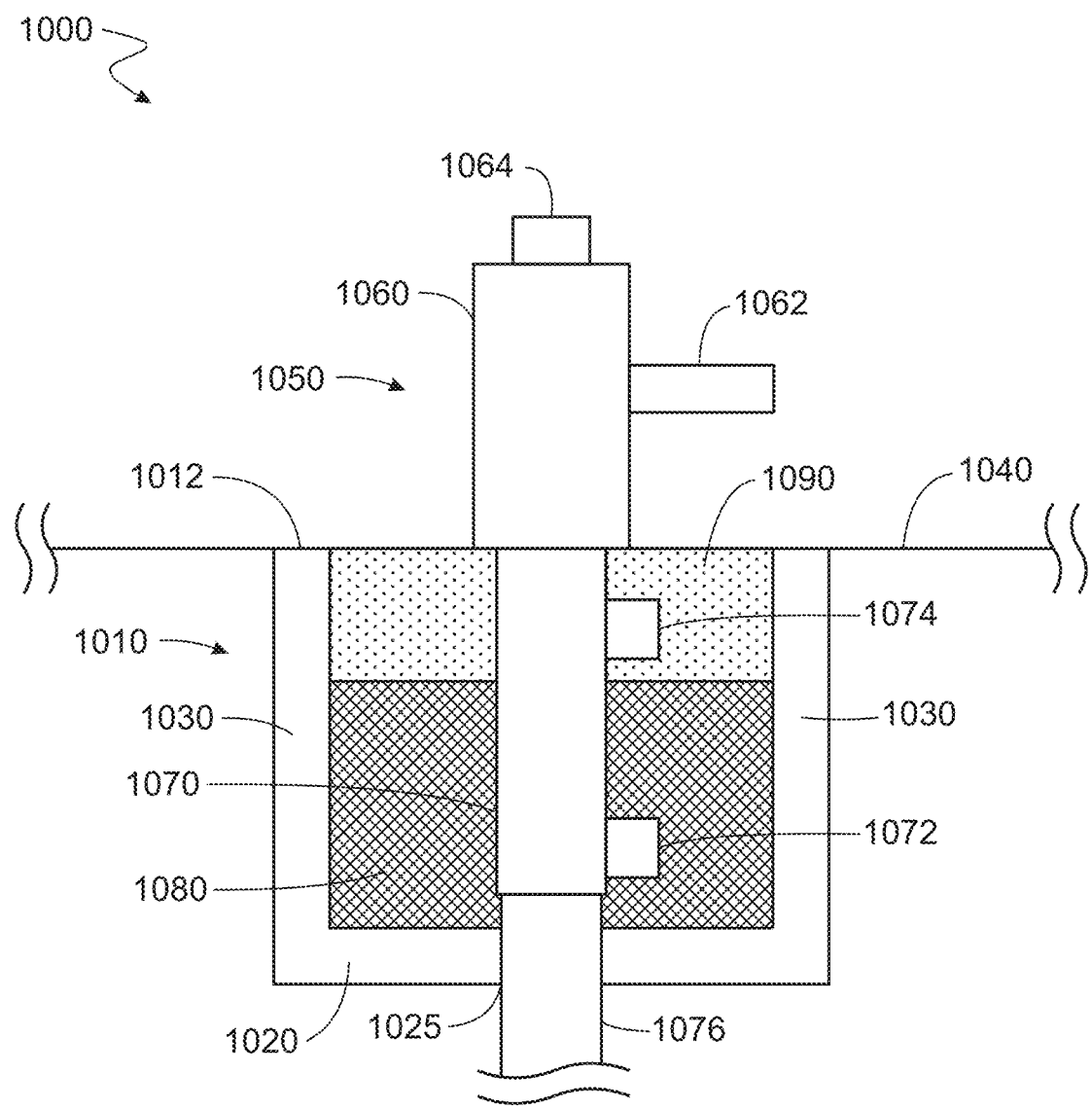
FIG. 1 is a schematic illustration of a system.

FIG. 1 schematically depicts a system 1000, which can, for example, be part of a well, such as an oil well, a gas well or a water well.

The system 1000 includes a well cellar 1010 having a bottom 1020 and sidewalls 1030. The uppermost surface 1012 of the well cellar 1010 substantially corresponds to the surface 1040 of the earth such that the well cellar 1010 is generally located belowground.

The system 1000 also includes a wellhead 1050 having an aboveground wellhead region 1060 that extends above the surface 1040 and a belowground wellhead region 1070 that extends below the surface 1040, through the well cellar 1010, and through an opening 1025 in the bottom 1020 of the well cellar 1010. Generally, the wellhead regions 1060 and 1070 have a variety of different components. As an example, as shown in FIG. 1, the aboveground wellhead region 1060 can include a water injection line flange 1062 and a crown adapter 1064, and the belowground wellhead region 1070 can include a landing base 1072 and a tubing spool 1074. The wellhead 1050 includes a surface casing 1076 having its exterior surface exposed within the well cellar 1010. The surface casing 1076 houses a plurality of nested casings that are exposed beneath the bottom 1020 of the well cellar 1010 (see FIGS. 2-4).

Figure 2:
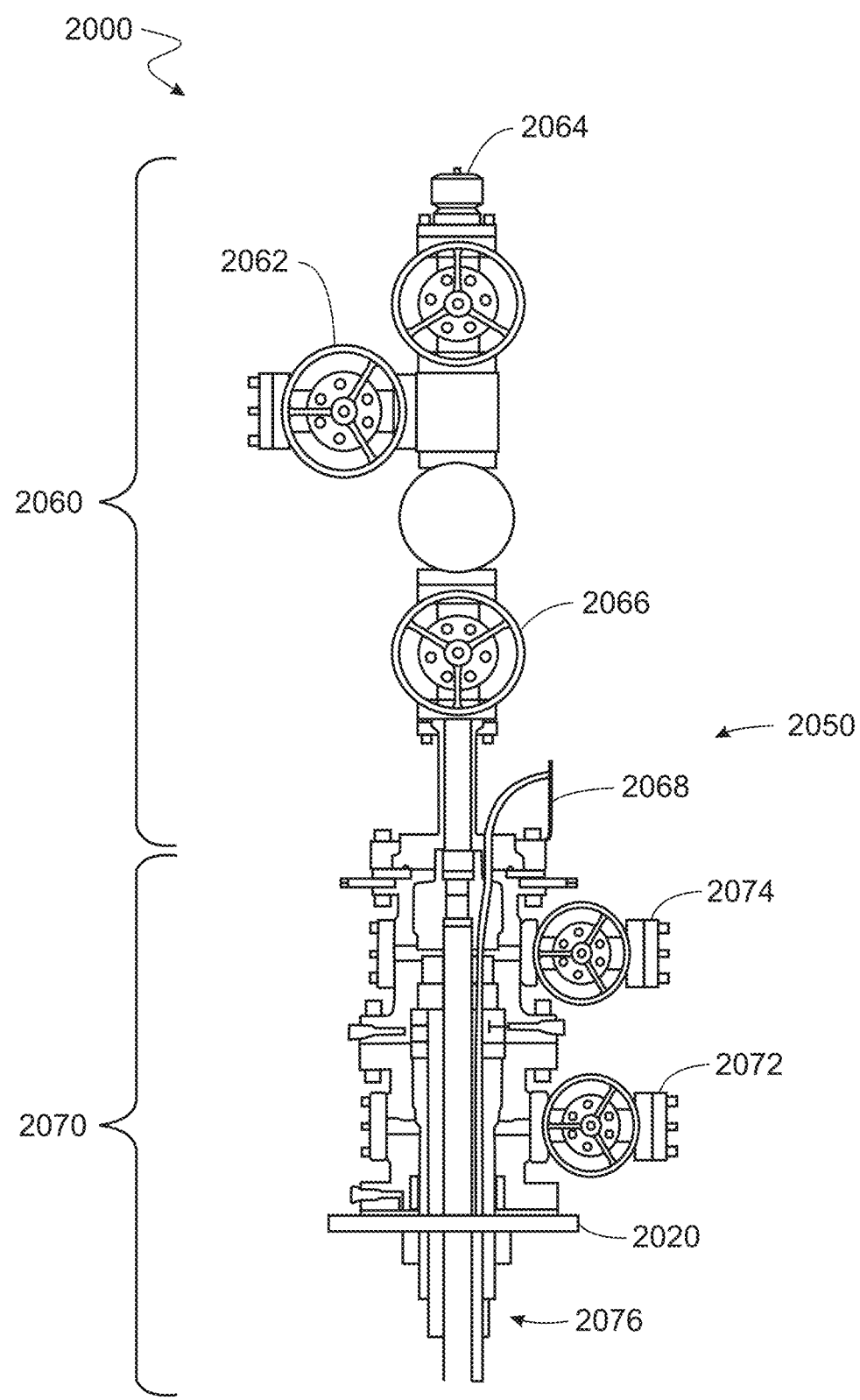
FIG. 2 is a schematic illustration of a system.

FIG. 2 schematically depicts a system 2000 including a wellhead 2050 having aboveground and belowground regions 2060 and 2070, respectively. The aboveground region 2060 includes a water injection valve 2062, a crown adapter 2064, an additional valve 2066 and a tubing bonnet 2068. The belowground region 2070 includes a landing base 2072 and a tubing spool 2074, which are disposed above a bottom 2020 of the well cellar. The belowground region 2070 also includes a plurality of nested casings housed within a surface casing (generally depicted at 2076) and extending below the bottom 2020 of the well cellar.

Figure 3:
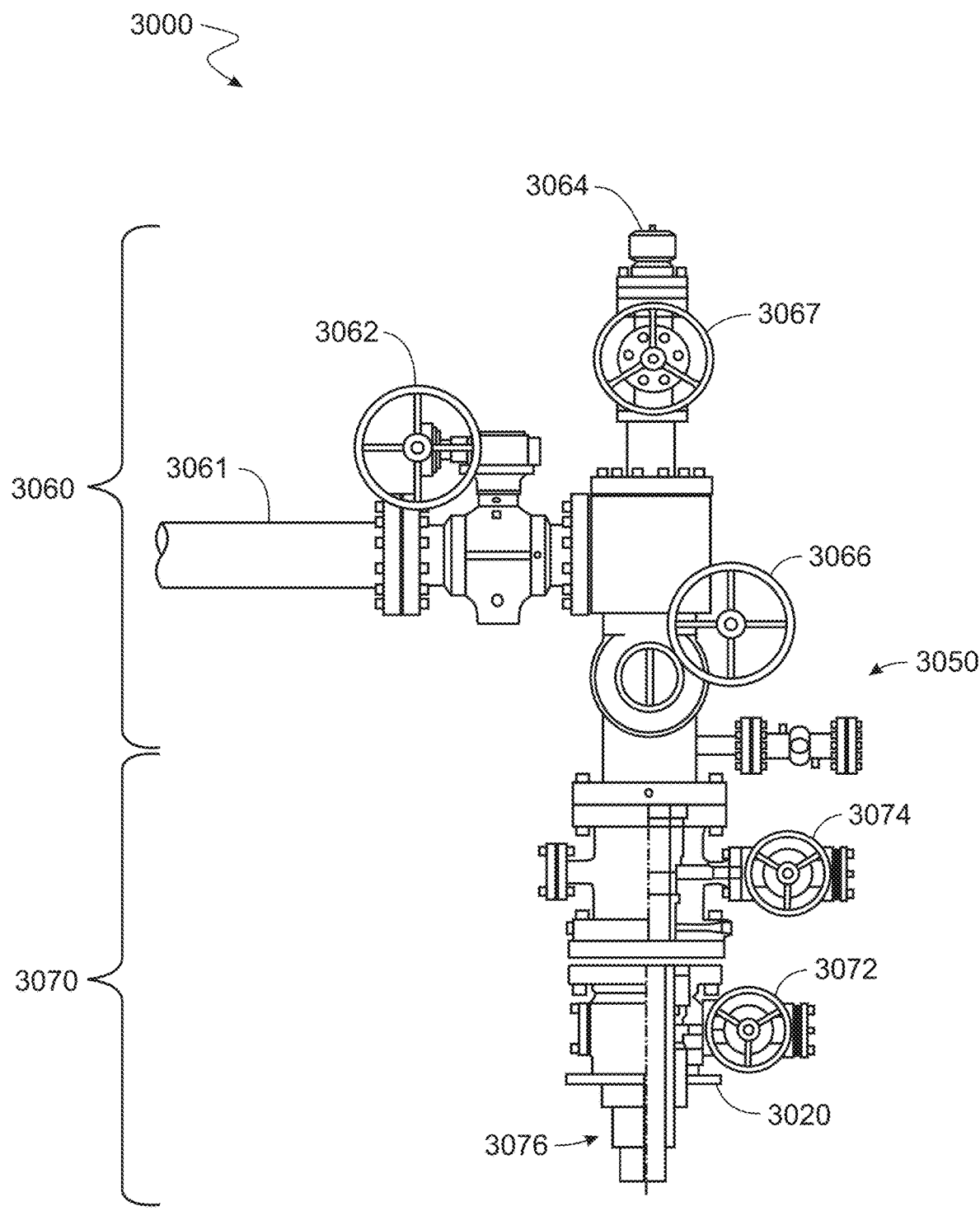
FIG. 3 is a schematic illustration of a system.

FIG. 3 schematically depicts a system 3000 including a wellhead 3050 having aboveground and belowground regions 3060 and 3070, respectively. The aboveground region 3060 includes a water flow pipe 3061 in fluid communication with a water injection valve 3062. In addition, the aboveground region includes a crown adapter 3064 and additional valves 3066 and 3067. The belowground region 3070 includes a landing base 3072 and a tubing spool 3074, which are disposed above a bottom 3020 of the well cellar. The belowground region 3070 further includes a surface casing and a plurality of nested casings (generally depicted at 3076) that extend through and below the bottom 3020 of the well cellar. In some embodiments, the injection line flange between the water flow pipe 3061 and the water injection valve 3062 can leak, for example, due to air exposure and continuous water flow. This can cause the leaking water to spill onto the sand covering the well cellar, which can result in corrosion of the surface casing 3076, the landing base 3072 and/or the tubing spool 3074.

Figure 4:
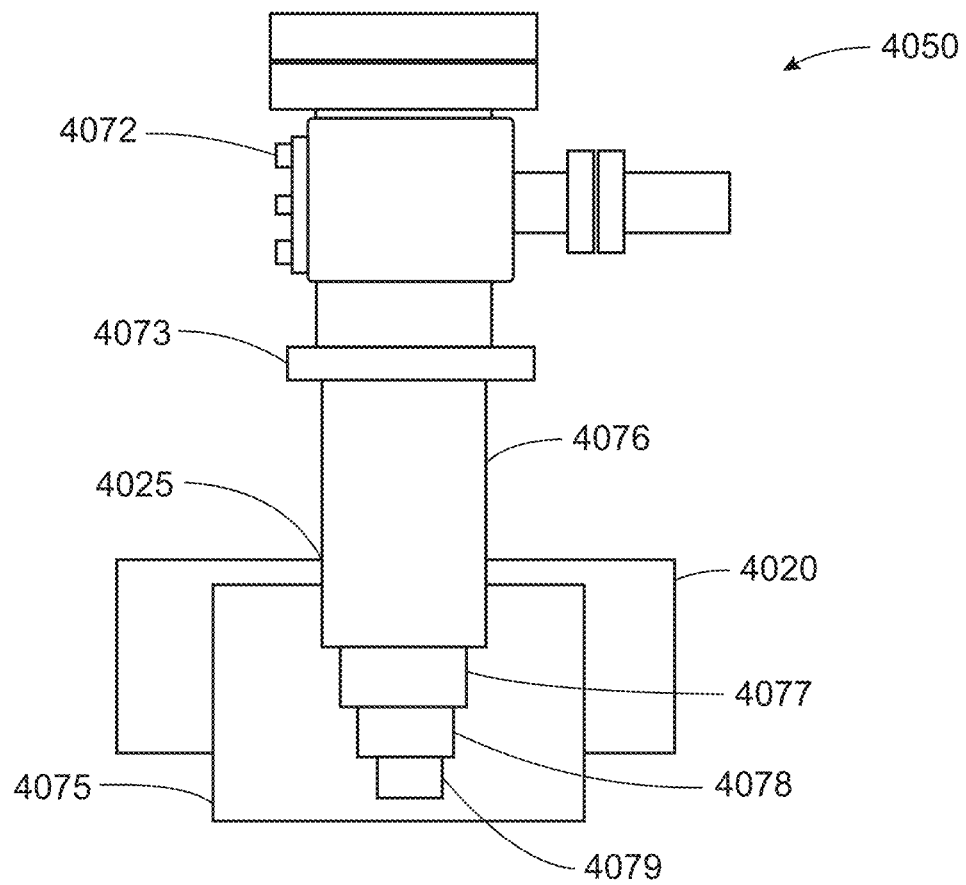
FIG. 4 is a schematic illustration of a system.

FIG. 4 schematically depicts a belowground region of a wellhead 4050. Above a bottom 4020 of the well cellar, the wellhead 4050 includes a landing base 4072, a donut plate 4073 and a surface casing 4076. The surface casing 4076 extends through an opening 4025 in the bottom 4020 of the well cellar and into a conductor 4075. The surface casing 4076 houses a plurality of nested casings 4077, 4078 and 4079. In some embodiments, the bottom 4020 of the well cellar is made of cement. The integrity of the cement is sometimes low and cracks can develop in the cement, which can allow water penetration thereby inducing corrosion, for example, at the interface of the surface casing 4076 and the bottom 4020 of the well cellar. The polyacrylamide gel can reduce, e.g., prevent, such corrosion.

Referring again to FIG. 1, the system 1000 also includes a polyacrylamide gel 1080 that completely covers a portion of the exterior surface of the surface casing 1076 and the landing base 1072 and extends to the bottom 1020 and sidewalls 1030 of the well cellar 1010. Thus, the polyacrylamide gel 1080 occupies a volume of space between the well cellar 1010, and the gel-covered exterior surfaces of the surface casing 1076 and the landing base 1072. A layer of sand 1090 is disposed on top of the polyacrylamide gel 1080. With this arrangement, the polyacrylamide gel 1080 acts as a barrier that, over a substantial period of time, can prevent water present in the sand 1090 from reaching the gel-covered exterior surfaces of the surface casing 1076 and the landing base 1072, thereby maintaining substantially dry conditions around the gel-covered exterior surface of the surface casing 1076 and the landing base 1072. As a result, over these periods of time, the polyacrylamide gel helps to resist, and even completely prevent, corrosion of the gel-covered exterior surfaces of the surface casing 1076 and the landing base 1072.

In general, the polyacrylamide gel 1080 contains a polyacrylamide and water. Generally, the polyacrylamide gel is formed by exposing polyacrylamide to water such that the polyacrylamide swells to form the gel, after which the gel 1080 can be disposed in the well cellar 1010 using any appropriate method. In some embodiments, the polyacrylamide is disposed in the well cellar 1010 in dry solid form, such as a powder. Water is then added to form the gel, after which the sand 1090 is disposed on top of the gel 1080. In certain embodiments, the water and polyacrylamide are first combined (with mixing if appropriate), and then disposed in the well cellar 1010 to form the gel 1080, after which the sand 1090 is disposed on top of the gel 1080.

In some embodiments, the gel 1080 contains at least 1 kg (e.g., at least 10 kg, at least 100 kg) polyacrylamide and at most 1000 kg (e.g., at most 500 kg, at most 300 kg) polyacrylamide.

In certain embodiments, the gel 1080 contains at least 0.1 bbl (e.g., at least 0.25 bbl, at least 0.5 bbl) water and at most 5 bbl (e.g., at most 2 bbl, at most 1 bbl) water.

In some embodiments, the gel 1080 contains at least 5 (e.g. 5.88, at least 10, at least 15, at least 20, at least 25, at least 30, at least 35, at least 40, at least 45, at least 50, at least 55, at least 55.71) weight percent (w.t. %) polyacrylamide and at most 56, (e.g. 55.7, at most 55, at most 50, at most 45, at most 40, at most 35, at most 30, at most 25, at most 20, at most 15, at most 10) wt. % polyacrylamide.

In some embodiments, the gel 1080 contains at least 44 (e.g. 44.29, at least 45, at least 50, at least 55, at least 60, at least 65, at least 70, at least 75, at least 80, at least 85, at least 90, at least 94, at least 94.12) w.t. % water and at most 95 (e.g. at most 94.12, at most, 94, at most 90, at most 85, at most 80, at most 75, at most 70, at most 65, at most 60, at most 55, at most 50, at most 45) wt. % water.

Optionally, the gel 1080 can contain one or more additional constituents, such as a corrosion inhibitor (e.g., O-3670R) and/or an oxygen scavenger (e.g., sodium sulfite ($Na_2SO_3$), OXYGON™ or FE-20). In some embodiments, the gel 1080 contains at least 0.04 wt. % (e.g., at least 0.07 wt. %, at least 0.1 wt. %) oxygen scavenger and at most 1 wt. % (e.g., at most 0.9 wt. %, at most 0.8 wt. %) oxygen scavenger. In certain embodiments, the gel 1080 contains at least 5 wt. % (e.g., at least 8 wt. %, at least 10 wt. %) corrosion inhibitor and at most 15 wt. % (e.g., at most 12 wt. %) corrosion inhibitor.

Generally, the polyacrylamide contains a repeat unit having the following chemical structure.

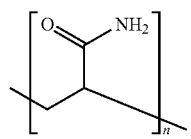

In certain embodiments, the polyacrylamide can be a copolymer that contains the above repeat unit and one or more different repeat units. Examples of such repeated units (in addition to acrylamide) include but are not limited to N,N'-methylenebisacrylamide, N,N'-bisacrylylcystamine, N,N'-diallyltartardiamide, N,N'(1,2-dihydroxyethylene)bisacrylamide, ethylene diacrylate, and Piperazine diacrylate.

In some embodiments, the polyacrylamide is substantially uncrosslinked. For example, the polyacrylamide has a cross-linking density of less than $10^{-8}$ (e.g., less than $10^{-9}$, less than $10^{-10}$) mol/cm$^3$. In certain embodiments, the polyacrylamide is a linear polyacrylamide, i.e., the polyacrylamide is completely uncrosslinked.

In certain embodiments, the polyacrylamide can have a number average molecular weight of at least 1,000 (e.g. at least 10,000, at least 40,000, at least 50,000, at least 100,000, at least 150,000, at least 200,000, at least 300,000 at least 400,000, at least 500,000, at least 520,000, at least 600,000, at least 700,000, at least 800,000, at least 900,000, at least 1,000,000, at least 2,000,000, at least 3,000,000, at least 4,000,000, at least 5,000,000, at least 6,000,000, at least 7,000,000, at least 8,000,000, at least 9,000,000) g/mol and at most 10,000,000 (e.g. at most 9,000,000, at most 8,000,000, at most 7,000,000, at most 6,000,000, at most 5,000,000, at most 4,000,000, at most 3,000,000, at most 2,000,000, at most 1,000,000, at most 900,000, at most 800,000, at most 700,000, at most 600,000, at most 520,000, at most 500,000, at most 400,000, at most 300,000, at most 200,000, at most 150,000, at most 100,000, at most 50,000, at most 40,000, at most 10,000) g/mol.

In certain embodiments, the polyacrylamide can have a weight average molecular weight of at least 1,000 (e.g. at least 10,000, at least 40,000, at least 50,000, at least 100,000, at least 150,000, at least 200,000, at least 300,000 at least 400,000, at least 500,000, at least 520,000, at least 600,000, at least 700,000, at least 800,000, at least 900,000, at least 1,000,000, at least 2,000,000, at least 3,000,000, at least 4,000,000, at least 5,000,000, at least 6,000,000, at least 7,000,000, at least 8,000,000, at least 9,000,000) g/mol and at most 10,000,000 (e.g. at most 9,000,000, at most 8,000,000, at most 7,000,000, at most 6,000,000, at most 5,000,000, at most 4,000,000, at most 3,000,000, at most 2,000,000, at most 1,000,000, at most 900,000, at most 800,000, at most 700,000, at most 600,000, at most 520,000, at most 500,000, at most 400,000, at most 300,000, at most 200,000, at most 150,000, at most 100,000, at most 50,000, at most 40,000, at most 10,000) g/mol.

In some embodiments, the volume occupied by the gel is at least 1 ft$^3$ (e.g., at least 5 ft$^3$, at least 10 ft$^3$) and at most 30 ft$^3$ (e.g., at most 25 ft$^3$, at most 20 ft$^3$).

EXAMPLE

Figure 5:
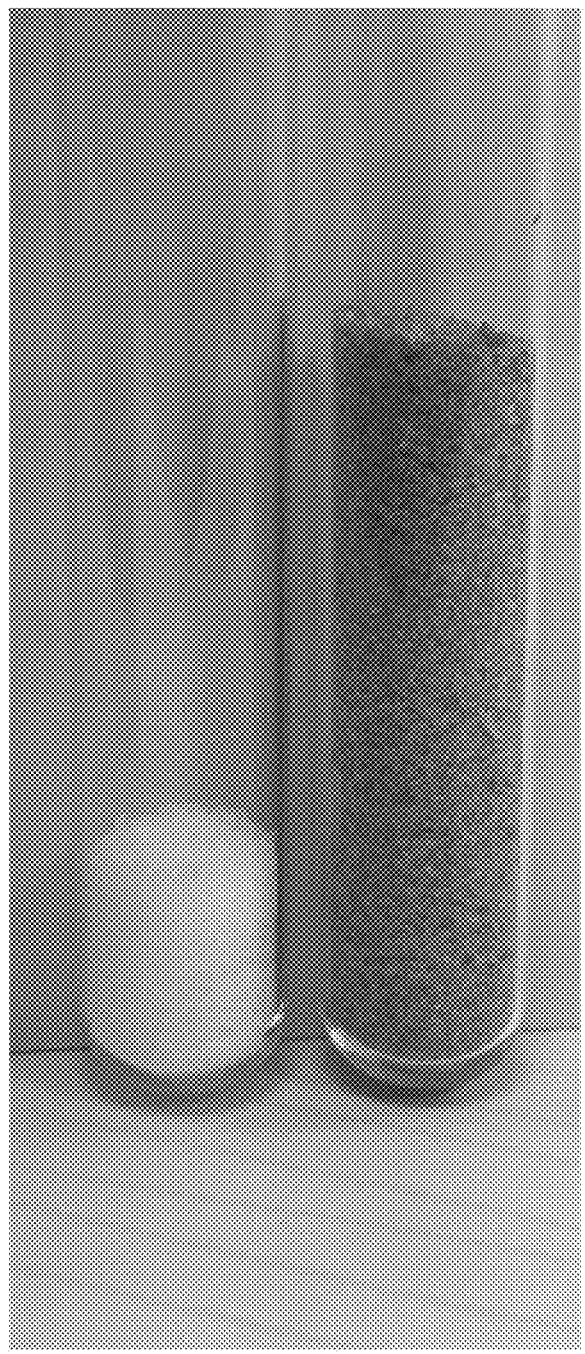
FIG. 5 is a photograph of sand and polyacrylamide powder in respective test tubes.
Figure 6:
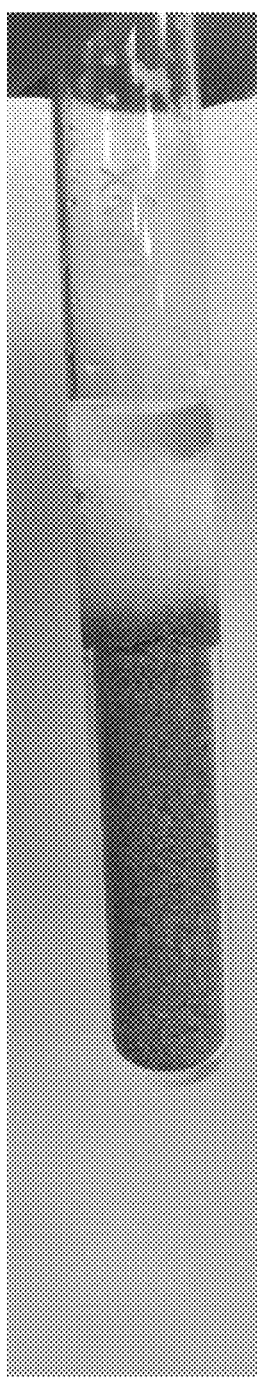
FIG. 6 is a photograph of water formation on a polyacrylamide gel, which, in turn, is supported by sand.
Figure 7:
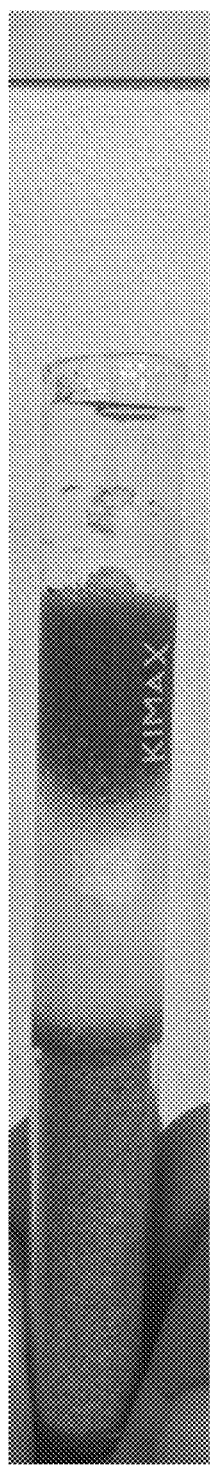
FIG. 7 is a photograph of wet sand supported by a polyacrylamide gel, which, in turn, is supported by sand.

A layer of dry sand was disposed in a test tube to mimic a well cellar. 1.25 g of polyacrylamide powder (OmniPur® Linear Polyacrylamide, MERCK) was disposed on the sand to form a polyacrylamide layer. FIG. 5 shows the sand and polyacrylamide in separate test tubes before the polyacrylamide powder was put on top of the sand. 7.5 mL of water was added to the polyacrylamide, which resulted in an expansion of the mixture, after which 5 mL of additional water was added to confirm that the polyacrylamide gel was impermeable to water by visual observation. FIG. 6 shows the test tube with the layer of sand covered with the polyacrylamide gel, which was covered by a layer of water formed by the additional 5 mL of water. 3 hours later, sand was placed on top of the polyacrylamide gel. Then, 5 mL of water was added to confirm that the polyacrylamide gel was impermeable to water by visual observation. FIG. 7 shows the lower layer of sand, covered by the polyacrylamide gel, which in turn was covered by a layer of wet sand.

OTHER EMBODIMENTS

While certain embodiments have been disclosed, the disclosure is not limited to such embodiments.

As an example, while embodiments have been disclosed in which a layer of sand is disposed on top of the layer of polyacrylamide gel, in some embodiments, a layer of sand is not present above the polyacrylamide gel. As an example, in certain embodiments, the polyacrylamide gel may be covered with a different material, such as but not limited to silica, alumina, or small gravel rocks. As another example, in some embodiments, the polyacrylamide gel extends to the upper surface of the well cellar, i.e., the surface of the earth.

What is claimed:

1. A system, comprising:
   a well cellar comprising a bottom and sidewalls extending from the bottom;
   a wellhead comprising an aboveground region extending above the well cellar and a belowground region in the well cellar, the belowground region of the wellhead comprising a wellhead component having an exterior surface;
   a polyacrylamide gel occupying a volume extending from the bottom and sidewalls of the well cellar to the exterior surface of the wellhead component, wherein the polyacrylamide gel covers the exterior surface of the wellhead component; and
   sand covering an upper surface of the polyacrylamide gel.

2. The system of claim 1, wherein polyacrylamide in the polyacrylamide gel is uncrosslinked.

3. The system of claim 1, wherein polyacrylamide in the polyacrylamide gel has a number average molecular weight of from 1,000 to 10,000,000 g/mol.

4. The system of claim 1, wherein polyacrylamide in the polyacrylamide gel has a weight average molecular weight of from 1,000 to 10,000,000 g/mol.

5. The system of claim 1, wherein the polyacrylamide gel substantially prevents water from passing through the polyacrylamide gel to reach the exterior surface of the wellhead component.

6. The system of claim 1, wherein the polyacrylamide gel seals pores in the sand.

7. The system of claim 1, wherein the wellhead component comprises a landing base.

8. The system of claim 1, wherein the wellhead component comprises a surface casing.

9. The system of claim 8, wherein the polyacrylamide gel covers an exterior surface of an additional wellhead component.

10. The system of claim 9, wherein the additional wellhead component comprises a landing base.

11. The system of claim 1, wherein the system comprises a well selected from the group consisting of an oil well, a gas well and a water well.

12. The system of claim 1, wherein the volume occupied by the polyacrylamide gel is at least 1 ft$^3$.

13. The system of claim 1, wherein the bottom of the well cellar has an opening, and the wellhead comprises a plurality of casings that pass through and extend beneath the bottom of the well cellar.

14. The system of claim 13, wherein the plurality of casings comprise a surface casing that houses the other casings.

15. A well, comprising:
   a well cellar comprising a bottom and sidewalls extending from the bottom;
   a wellhead comprising an aboveground region extending above the well cellar and a belowground region in the well cellar, the belowground region of the wellhead comprising a component having an exterior surface;
   a polyacrylamide gel occupying a volume extending from the exterior surface of the component to the bottom and sidewalls of the well cellar; and
   sand covering an upper surface of the polyacrylamide gel, wherein the well comprises a member selected from the group consisting of an oil well, a gas well and a water well.

16. A method of reducing corrosion of an exterior surface of a wellhead component in a well cellar, the method comprising:
   disposing a polyacrylamide gel within the well cellar so that the polyacrylamide gel covers the exterior surface of the wellhead component and extends to a bottom and sidewalls of the well cellar; and
   covering the polyacrylamide gel with sand.

17. The method of claim 16, wherein disposing the polyacrylamide gel within the well cellar comprises:
   disposing polyacrylamide within the well cellar; and
   adding water to the polyacrylamide to form the polyacrylamide gel.

18. The well of claim 15, wherein the polyacrylamide gel seals pores in the sand.

19. The well of claim 15, wherein polyacrylamide in the polyacrylamide gel is uncrosslinked.

20. The method of claim 16, wherein the polyacrylamide gel seals pores in the sand.

* * * * *